United States Patent

Londoño

[11] Patent Number: 6,004,598
[45] Date of Patent: Dec. 21, 1999

[54] PROCESS FOR MANUFACTURING RECENTLY EXTRACTED FRUIT PULP, PACKING METHOD AND THE PRODUCT OBTAINED THEREBY

[75] Inventor: Sergio Hernando Durana Londoño, Santa fe de Bogota, Colombia

[73] Assignee: Citricos Naturales, Ltda, Bogota, Colombia

[21] Appl. No.: 09/021,488

[22] Filed: Feb. 10, 1998

[30] Foreign Application Priority Data

Feb. 11, 1997 [CO] Colombia .............................. 97006875
Dec. 18, 1997 [CO] Colombia .............................. 97073874

[51] Int. Cl.$^6$ .............................. A21D 10/02; A21D 4/00; A21L 2/00
[52] U.S. Cl. ........................ 426/127; 426/327; 426/330.5; 426/333; 426/399; 426/521; 426/599
[58] Field of Search .................................... 426/127, 327, 426/330.5, 333, 599, 399, 521

[56] References Cited

U.S. PATENT DOCUMENTS

| | | | |
|---|---|---|---|
| 3,846,570 | 11/1974 | Vetter et al. ............................. | 426/399 |
| 4,716,044 | 12/1987 | Thomas et al. ............................ | 426/51 |
| 5,021,251 | 6/1991 | McKenna et al. ................... | 426/330.5 |
| 5,260,086 | 11/1993 | Downton et al. ....................... | 426/599 |
| 5,614,238 | 3/1997 | Mendez .................................. | 426/397 |

*Primary Examiner*—Nina Bhat
*Attorney, Agent, or Firm*—Baker & McKenzie

[57] ABSTRACT

The present invention embraces a fruit pulp extraction process that avoids the concentration or freezing of the pulp, together with the packaging method that allows the processor to offer fresh and natural tasting fruit pulps to be consumed at any moment by only adding water and thus obtaining instantly a naturally fresh tasting fruit juice. The invention also includes the product obtained through this process-packaging combination.

24 Claims, No Drawings

PROCESS FOR MANUFACTURING RECENTLY EXTRACTED FRUIT PULP, PACKING METHOD AND THE PRODUCT OBTAINED THEREBY

FIELD OF THE INVENTION

This invention is generally related with the preservation of fruit pulp and its packaging. More particularly, the invention is related with the preservation and packaging of fruit pulps, using recently extracted non-concentrated pulp as a raw material, therefore looking to conserve the taste features and the original texture of the fruit, and with the packaging avoiding the need for refrigeration during subsequent transportation and storage.

BACKGROUND OF THE INVENTION

One of the primary goals in the field of food sciences, in particular with the area of industrial mass food production, is maintaining the best fidelity to the features of the natural product. This is not an easy task, since many of the processes and additives that permit a high yield at an industrial level are precisely those that alter the original features of the food product, thus leading to an optimization process where one is obligated to choose between yield in the process or fidelity to the natural product.

In the field of fruit pulps, much research and development has taken place with the purpose of maintaining the original taste qualities of recently extracted pulp. The recently extracted pulp tastes like fresh fruit pulp made at home, and maintains the physiochemical characteristics of the fruit. On the contrary, when the pulp is subject to freezing and concentration (which is typical in the prior art), its taste and physicochemical characteristics vary, and the texture of the juice as the end product is degraded, thus lowering the final quality of the product. For purposes of this document, it is important to establish the difference between fruit pulp and fruit juice. The pulp is the material extracted directly from the fruit, which normally is mixed with water or another liquid to drink (i.e. most consumers do not consume the pulp directly). The juice is precisely this blend of the pulp with water, in other words, the end product for the consumer.

When the fruit is peeled or opened, the pulp suffers almost immediately from biological degradation caused by various factors, which makes it especially hard to process, transport, or store at an industrial level, especially at room temperature. One of the most important problems is the oxidation process. In the presence of light and oxygen, the pulp's natural flavor becomes bitter and at the same time turns to the color brown which gives it an unacceptable appearance. Various solutions have been proposed in the prior art to resolve or slow down this process, e.g., concentration of the fruit pulp, freezing or refrigeration, addition of chemical preservatives, and the reduction of oxygen in the final packaging. However, a satisfactory product that has high fidelity for home extracted fruit pulp and that avoids the oxidation process without the need for concentrating or refrigerating has not been obtained.

Alteration of the fruit pulp by microbiological action also exists. Recently extracted fruit pulps contain numerous microorganisms of different types (bacteria, molds and yeasts). The first microbiological alteration that can be occur quickly at room temperature is alcohol fermentation, which is caused by different yeasts and in some cases accompanied by superficial proliferation of molds and of lactic fermentation. For this reason, recently extracted fruit pulp must be considered an extremely perishable article. Solutions for this problem in the art of food preservation generally include the use of preservatives of wide commercial use, such as sodium benzoate and potassium sorbate, as well as refrigeration and concentration.

At industrial production levels, additional problems also exist for the processing of the fruit pulp or its byproducts. One of them is maintaining homogeneity in the final product, since it is natural for variations to exist within different batches of fruit used to provide the raw material for the pulp, particularly where different species of fruits are used, or when they come from different geographical zones. Two key variable characteristics are the acidity, measured in pH, and the sugar levels, also known as the "Brix level". The acidity is typically leveled with the introduction of citric acid. The sugar level is leveled with the sucrose, fructose, or glucose.

Another problem that presents itself at the industrial level is that of maintaining a continuous and well preserved source of fruit. Many times it is necessary to import the fruit or the pulp from different regions with the purpose of satisfying the market demand, which also implies the adequate preservation of this fruit or pulp during its transportation and storage. The worldwide renowned solution for this problem has been to use the concentrated and/or frozen pulp as the raw material. The concentrated or frozen pulp permits easier handling, and at the same time provides a homogenous source at the moment of reconstituting the concentrate so as to once again obtain the pulp. At an industrial level, a production plant is more efficient when it uses concentrated or frozen pulp, instead of obtaining its own fruits and processing them. The concentrated and frozen pulp is easy to come about, is always available, especially where futures markets exist for this commodity. The pulp concentrate is produced by one of the various concentration processes well known in the state of the art (for example, low pressure evaporation). In theory, the dilution of a good fruit pulp with the adequate amount of water should provide a product equal to fresh made juice. The reality is very different because of the alterations that happen during its production and storage, which naturally affect the taste properties of the pulp considerably. For example, the concentration process almost always implies a thermal evaporation process, which subjects the pulp to temperatures that without a doubt induce important chemical changes. Alternatively, the darkening process is also more problematic in the case of concentrates and implies the use of refrigeration or chemicals to counteract it. The use of concentrates also makes it impossible for the maker of the product to regulate the initial flavor and texture of the recently extracted pulp, which is a critical aspect if one desires to reproduce pulp freshly obtained at home. Obviously, if one desires to reproduce a home made pulp, the process for making freshly made pulp at home must be simulated; however, it is common for concentrate manufacturers to tend to make good use of the capacity of their machines to practice an excessive extraction that allows yield improvement, but with adverse effects to the taste properties and the stability of the pulp. No suggestion nor teaching exists in the state of the art, in relation to the industrial production of pulps, to go directly from the recently extracted pulp to the packaging process, and moreover, the opposite seems suggested: it is almost mandatory to use frozen pulp or concentrate as a raw material for reasons of efficiency and convenience.

Another serious problem that results during industrial level production is the degradation of the pulp's texture as a final product. The natural texture of the juice, known as mouthfeel, must reflect a certain quantity of solids that are normally present in the pulp after the fruit is extracted. A great portion of the texture degradation occurs during the freezing of the concentrate (for its transportation and storage), which causes rupture in the cellular walls of the pulp's compounds, thus seriously affecting the texture of the final juice. The rest of the degradation is the result of the use of mixers, pumps, and filters during the production process. A known solution to give back the original texture to the juice is the latter addition of pulp, with the purpose of trying to recreate the natural mouthfeel created by the presence of solids in a defined ratio. (For example, see U.S. Pat. No. 5,260,086—for orange juices). Degradation of the frozen pulp or concentrate also exists at the level of colloidal alterations, by means of which the concentrate's elevated viscosities can give way to gelatination phenomenon, which of course results in the loss of all of its commercial value. This last type of degradation can be avoided with the addition of chemicals such as sodium citrate, or through the inactivation of pectolytic enzymes by thermal processes.

The conventional commercial presentation of the fruit pulp is a package, typically refrigerated or frozen, that contains a large serving, in other words, for 4 or more glasses of juice. To prepare the juice, the consumer must mix the pulp in water (or other liquid, such as milk), and in many cases a blender is used given the frozen state of the pulp. The majority of consumers consider that it is only worthwhile to prepare juice (in other words, mix the pulp with water) when various glasses will be prepared and not only one. Likewise, this juice is normally only prepared where it is possible to maintain the pulp refrigerated, and where methods exist for mixing the pulp with water. In other words, the conventional fruit pulp package does not allow the consumer to carry an individual portion of pulp (say in her pocket) and to mix it easily with water at any time of day.

SUMMARY OF THE INVENTION

The present invention discloses a fruit pulp extraction process, which completely avoids the concentration or freezing of the pulp, together with a method of packaging the pulp that provides the mass market with a recently extracted fruit pulp which needs no refrigeration and preferably is available in an individual serving package size. As used herein, the term "recently extracted fruit pulp" describes fruit pulp that has recently been separated from the fruit, that never has been or will be subject to any concentration or freezing process, and that has not undergone any significant deterioration. Equally important, the invention also includes the product obtained through this process-package combination, and particularly the individual serving presentation of the product.

Market studies done in Colombia by the holder of the present application demonstrate that 83% of the people polled consider that the product manufactured and packaged using the process disclosed in this application is easy and practical to prepare. Also, 68% of the people polled indicated that is was probable or definite that the product and its package provided more opportunities to drink juice at any time of day. In addition, 85% of the people polled indicated that, before this product, they would only drink juice with their main meals, while with the invention, 79% would drink it at any time.

The present invention can be applied to citrus fruits, such as lemons, oranges, tangerines, grapefruits and the like; as well as other fruits, such as raspberries, mangos, passion fruit, lulos, guayabas, pineapples, bananas, and combinations thereof.

The extraction process begins with washing the fruits, previously classified according to size. After washing, a short thermal process is applied to reduce the foci of contamination on the peel or external surface of the fruit. Afterwards, the fruit is processed according to the extraction systems corresponding to the fruit, all of which are well known in the prior art. Once the pulp has been obtained, it passes through a filter and subsequently enters the stirring and addition tank, where conditions of purified air and near absence of light exist, all of which contribute to maintaining aseptic conditions. The temperature of the tank is maintained at approximately 4° C. (above freezing) with the purpose of preserving the pulp. Various compounds, such as sodium benzoate and potassium sorbate, are added into the tank to help homogenize and preserve the pulp. Glucose oxidase can also be added with the purpose of lowering oxygen concentration, thereby inhibiting the action of oxygen within the pulp. Subsequently, the pulp is transferred to the packaging system, where the packaging is undertaken under similar conditions as those in the addition and stirring tank. In a preferred embodiment, the pulp is wrapped in an individual serving package, made of a trilayered coextruded material that does not allow the entry of light nor the exchange of gases. No concentration or freezing step exists.

One general object of the invention is to provide a product that consists of recently extracted fruit pulp packed in individual serving packages that, when mixed with water, yields a fresh tasting fruit juice.

Another general object is to provide a fruit pulp that does not originate from a concentrate and is packaged in a way that does not require refrigeration or freezing for its transportation or storage.

Another general object of the invention is to allow, primarily through the package, the consumption of fruit juice as a daily, easy, fast, natural and cheap beverage.

A particular object of the invention is to handle individual servings, thereby achieving the standardization of the flavor, and avoiding in this manner the consumer's need to measure and separate the quantities at the moment of consumption.

Another particular object of the invention is to allow for savings in the costs of transportation and storage, because no additional water is being transported.

DETAILED DESCRIPTION OF THE INVENTION

The extraction process begins with washing the fruits, previously classified according to size. After washing, a short thermal process is applied to reduce the foci of contamination on the peel or external surface of the fruit.

The extraction of pulp at the industrial level can be done with any adequate machine known in the art, and a filter can be used to remove the peel, bagasse, excessive solids and the seeds. The phrase "at the industrial level" refers to any process that implies the production of pulp in excess of 50 kilograms per batch. The phrase "excessive solids", refers to those solids that, because of aesthetic and taste reasons, normally do not form part of a freshly made juice at home, and because of regional preferences, it is difficult to establish precisely. The most important aspect within this initial phase is to try to recreate, at an industrial level, the conditions of domestic preparation, primarily as concerns the yield of the fruits (in other words, pulp weight to fruit weight) and the absence of excessive solids. In general, one seeks to avoid both high yield industrial extraction as well as filtering to the point of removing all solids.

After extraction, and with the purpose of guaranteeing a long pulp shelf life, the temperature is lowered and preferably is maintained at about 4° C. for the rest of the process. The pulp subsequently enters a slow stirring tank, avoiding substantial shear forces, where potassium sorbate is added in a concentration of about 0.05% (by weight) and sodium benzoate in a concentration of about 0.05% (by weight). The concentrations of these preservatives can be less (in fact, it is preferable) if the level of asepsis during the process is improved, which can be achieved using sound manufacturing techniques. The type of preservative can also vary, since it is natural that new and better preservatives will be developed. To avoid potential problems of pulp oxidation, and thus bitter taste, about 300 ppm of glucose oxidase can be added to a solution. (In certain circumstances, the manufacturer of the glucose oxidase may recommend a different concentration.) The purpose of this enzyme, and any equivalent alternative enzyme, is to consume the oxygen within the pulp, therefore lowering its oxidation capacity. With the purpose of standardizing the acidity to the required pH's, citric acid can be added in a concentration that varies between 0.02% and 0.08%. To homogenize the batch, sweeteners that are not sugar or essential oils can also be added. Once these additives have been introduced, they are gently stirred without allowing the levels of air saturation to rise within the blend. This can be done by generating negative pressure within the stirring tank and allowing the oxygen, nitrogen and other molecules present in the solution to exit the solution while it is being stirred; thus avoiding not only oversaturation of the pulp, but also lowering the initial saturation.

Subsequently, the pulp can be subject to a pasteurization process, if it is considered necessary and adequate for the type of pulp processed. For example, pasteurization is not recommended for citrus fruit pulps, particularly with lemons, since it affects the taste characteristics of the pulp substantially.

Finally, the pulp arrives at the packaging machine where it is allotted and packaged in an aseptic medium, preferably at a low partial pressure of oxygen (pressure lower than 100 kPa, also known as vacuum packaging) and in the dark, and preferably with filtered and disinfected air, all these process conditions contributing to the goal of avoiding contamination and thus the deterioration of the pulp. Packaging machines capable of carrying out this process are well known in the art. The processed pulp is packed in a package that does not allow for gas exchange nor the entrance of light, preferably manufactured with a trilayered and co-extruded material, well known in the packaging art. This type of packaging avoids the need for refrigeration or freezing of the pulp during its latter transportation and storage. While the packaging process is performed, the packaging material can be disinfected by subjecting it to ultraviolet radiation at the moment when the machine is being fed with the pulp. The preferred packaging intermediate layer is normally made of aluminum, which does not permit the entry of light nor gas exchange. The internal layer (the one in contact with the pulp) is made of low density polyethylene (LDPE) and allows for the wrapper to seal and isolate the juice from the aluminum (direct contact would allow for the exchange of ions that would affect the taste of the product.) The exterior layer is made of bioriented polypropylene (BOPP), which allows for the printing of communication and isolates the aluminum from making contact with the air. By using this packaging material, the pulp will remain isolated from the external medium until the moment of consumption. The size of the package where the pulp is packed is preferably an individual serving, in other words, the amount of pulp packaged is enough to make one glass of juice.

It is crucial to take into consideration the following three characteristics of the process and the product obtained by the process: (1) only recently extracted pulp is used as raw material, entirely avoiding the use of any concentrate, (2) during the manufacturing, transportation or storage process, freezing is entirely avoided with the purpose of reducing any degradation of the texture and taste of the juice, and (3) the package used avoids the need to refrigerate or freeze the pulp during transport and storage, therefore making it easier for the consumer to drink fresh fruit juices. This has allowed the inventor to obtain, in a surprising and unexpected manner, a fruit pulp preserved at room temperature with a taste and texture very similar to the fresh fruit pulp made at home. Additionally, this product allows the consumer to carry the fruit pulp in his/her pocket and make a naturally fresh juice simply by adding the contents of the package into a glass of water. Basically, this increases the demand for fruits since it allows fruit juice to be consumed not only at home or at restaurants, but also in any other setting. It has been found that the majority of consumers do not consider the preparation of only one glass of juice from conventional fruit pulp presentations worthwhile. However, the product of the present invention advantageously allows for the fast preparation of an individual serving, offering an almost instant reward. Concerning transport and storage, the present invention reduces costs as the weight and volume of a high quantity of water is eliminated, thereby providing advantages over commercially available bottled or canned beverages, or those packed in cartons.

At the level of pulp production and processing, it has been discovered that the present invention allows for the "democratization" of the same, since the facility to develop the invention is of relatively low cost and can be set up in low income farms. On one side, this allows for the reduction in transportation costs since there is no need to move the fruits (and their excess weight) from various farms to one central processing site (simply the pulp is packaged in each farm), and on another side, the profits from the production and the packaging are transferred over to the producer, this way shifting the equilibrium that many times is skewed in favor of the wholesaler. Finally, because the inventive product is classified as an unprocessed fruit pulp on the tariff schedule of various countries, it is not subject to taxes and tariffs that would normally be imposed on conventional processed juices.

It should be understood that the above mentioned description is merely illustrative according to the precepts of an adequate disclosure, and in no way does it limit the protection of the invention, which is defined only in the following claims.

What is claimed is:

1. A process at an industrial level for the production and packaging of fruit pulp, the process comprising the following consecutive steps:

(a) cleaning fruit;

(b) extracting a fruit pulp from the fruit under substantially aseptic conditions in substantial darkness;

(c) collecting the fruit pulp under substantially aseptic conditions in substantial darkness without concentrating or freezing the fruit pulp;

(d) adding at least one ingredient to the fruit pulp under substantially aseptic conditions, the ingredient homogenizing the taste characteristics of the fruit pulp;

(e) packing the fruit pulp under substantially aseptic conditions in wrappers made of a material that does not substantially allow the transmission of light or the exchange of gases.

2. The process of claim 1, wherein the step of adding at least one ingredient (d) is undertaken in darkness and at a pressure of less than 100 kPa.

3. The process of claim 2, wherein the step of adding at least one ingredient (d) comprises adding at least one ingredient selected from the group consisting of citric acid, sugar, a non-sugar sweetener, essential oils, and mixtures thereof.

4. The process of claim 3, wherein the step of adding at least one ingredient (d) further comprises adding at least one compound that preserves the fruit pulp and prevents oxidation of the fruit pulp.

5. The process of claim 4, wherein the compound is selected from the group consisting of glucose oxidase, sodium benzoate, potassium sorbate, and mixtures thereof.

6. The process of claim 5, wherein the step of packaging the pulp (e) is done in darkness.

7. The process of claim 6, wherein the wrappers used in packaging step (e) are manufactured from a tri-layered coextruded material.

8. The process of claim 7, wherein the packaging step (e) is done at a pressure of less than 100 kPa.

9. The process of claim 8, further including the step of pasteurizing the fruit pulp after step (d) and before step (e).

10. A packaged fruit pulp prepared according to the process of claim 1.

11. A packaged fruit pulp according to claim 10, wherein the step of adding at least one ingredient (d) comprises adding at least one ingredient selected from the group consisting of citric acid, sugar, a non-sugar sweetener, essential oils, and mixtures thereof.

12. A packaged fruit pulp according to claim 11, wherein the step of adding at least one ingredient (d) further comprises adding at least one compound that preserves the fruit pulp and prevents oxidation of the fruit pulp.

13. A packaged fruit pulp according to claim 12, wherein the compound is selected from the group consisting of glucose oxidase, sodium benzoate, potassium sorbate, and mixtures thereof.

14. A packaged fruit pulp according to claim 13, wherein the step of packaging the pulp (e) is done in darkness.

15. A packaged fruit pulp according to claim 14, wherein the wrappers used in packaging step (e) are manufactured from a tri-layered coextruded material.

16. A packaged fruit pulp according to claim 15, wherein the packaging step (e) is done at a pressure of less than 100 kPa.

17. A packaged fruit pulp according to claim 16 wherein the fruit pulp has a texture and viscosity similar to recently extracted fruit pulp without the addition of exogenous pulp.

18. A packaged fruit pulp according to claim 17 wherein the process does not utilize pulp concentrate as a raw material.

19. A packaged fruit pulp according to claim 18, wherein the process steps and any subsequent storage and transportation of the packaged fruit pulp does not require a freezing step or a concentration process step.

20. A fruit pulp according to claim 19 wherein the fruit pulp is packed in an individual serving wrapper.

21. A packaged fruit pulp according to claim 20 further including the step of pasteurizing the fruit pulp after step (d) and before step (e).

22. A packaged fruit pulp made by a process comprising the following consecutive steps:

(a) cleaning fruit;

(b) extracting a fruit pulp from the fruit under substantially aseptic conditions;

(c) collecting the fruit pulp under substantially aseptic conditions without concentrating or freezing the fruit pulp;

(d) optionally adding at least one ingredient to the fruit pulp under substantially aseptic conditions, the ingredient homogenizing the taste characteristics of the fruit pulp;

(e) packing the fruit pulp under substantially aseptic conditions in wrappers made of a material that does not substantially allow the transmission of light or the exchange of gases, said fruit pulp during one or more of said steps (c), (d) and (e) being maintained at about 4 degrees Centigrade.

23. A packaged fruit pulp according to claim 22, wherein the steps the steps (b), (c) and (d) are each undertaken in darkness, and step (d) is performed at a pressure of less than 100 kPa., and said step of adding at least one ingredient comprises adding at least one ingredient selected from the group consisting of citric acid, sugar, a non-sugar sweetener, essential oils, and mixtures thereof.

24. A packaged fruit pulp according to claim 22, wherein the packaged fruit pulp is in individual serving sized packages.

* * * * *